(12) United States Patent
Bishop

(10) Patent No.: US 8,157,448 B2
(45) Date of Patent: Apr. 17, 2012

(54) BEARING

(75) Inventor: Jeffrey C. Bishop, Derby (GB)

(73) Assignee: Rolls-Royce PLC, London (GB)

( * ) Notice: Subject to any disclaimer, the term of this patent is extended or adjusted under 35 U.S.C. 154(b) by 358 days.

(21) Appl. No.: 12/452,135

(22) PCT Filed: Jun. 6, 2008

(86) PCT No.: PCT/GB2008/001928
§ 371 (c)(1),
(2), (4) Date: Dec. 17, 2009

(87) PCT Pub. No.: WO2009/007669
PCT Pub. Date: Jan. 15, 2009

(65) Prior Publication Data
US 2010/0104227 A1  Apr. 29, 2010

(30) Foreign Application Priority Data
Jul. 7, 2007 (GB) .................................. 0713231.9

(51) Int. Cl.
*F16C 25/04* (2006.01)
*F16C 11/00* (2006.01)
*F16C 33/02* (2006.01)
*F16C 33/00* (2006.01)

(52) U.S. Cl. ......... 384/192; 384/154; 384/276; 384/627

(58) Field of Classification Search ............... 384/154, 384/155, 192, 202, 205, 302, 428, 627; 248/349.1, 248/521, 637, 676, 678
See application file for complete search history.

(56) References Cited

U.S. PATENT DOCUMENTS

| 543,410 | A | | 7/1895 | Taylor |
| 3,030,889 | A | | 4/1962 | Parker |
| 3,199,903 | A | | 8/1965 | Wood |
| 4,256,354 | A | * | 3/1981 | Peterson ........................ 384/202 |
| 5,441,349 | A | | 8/1995 | Shimizu |
| 2002/0085776 | A1 | * | 7/2002 | Blakley ........................ 384/192 |

FOREIGN PATENT DOCUMENTS

| DE | 663 245 | 7/1938 |
| JP | A 56-164217 | 12/1981 |
| WO | WO 02/101252 A1 | 12/2002 |

OTHER PUBLICATIONS

Written Opinion issued for International Application No. PCT/GB2008/001928 on Feb. 3, 2010.
International Search Report issued for International Application No. PCT/GB2008/001928 on Feb. 3, 2010.
British Search Report for British Application No. 0713231.9 dated Oct. 17, 2007.

* cited by examiner

*Primary Examiner* — Thomas R Hannon
*Assistant Examiner* — Adam D Rogers
(74) *Attorney, Agent, or Firm* — Oliff & Berridge, PLC

(57) ABSTRACT

There is a requirement to provide bearings in relatively low speed non continuous situations such as with regards to turn-over stands for engine and winding assembly. Previous bearings incorporating rolling elements are relatively expensive and over specified for such activities. By providing annulus members in a bearing cluster upon rocker members such that the annulus members can articulate in order to provide an appropriate bearing. Lubricating oil generally passes between the annulus members in a laminar stack such that the members can radially slide past each other to accommodate for eccentricities in a shaft supported by the bearing.

18 Claims, 3 Drawing Sheets

BEARING

The present invention relates to bearings and more particularly to bearings used to present components on stands during assembly, storage or repair.

There is a requirement to provide a bearing for use in relation to so-called turnover stands. Turnover stands are generally floor mounted assemblies allowing rotation of heavy components about a stable axis such that all parts of the component can be reached and worked upon. Examples of such components are gas turbine engines and transformer windings. It will be appreciated with regard to such bearings there is a generally non-continuous, low speed and low rotational duty requirement but as indicated a need for a high load carrying capability. It will also be understood that generally the shafts upon which the components were formed and assembled may have a relatively large diameter. In such circumstances previously standard ball and roller bearing assemblies have been used. These bearings are specified for higher speeds and continuous duty so the bearings are over specified and relatively expensive. Thus, previous bearings for stands have not been particularly tailored to actual duty cycle requirements.

In accordance with aspects of the present invention there is provided a bearing characterised by a plurality of annulus members, each annulus member having a rocker indent to receive a rocker arm extending over the plurality of annulus members between retainer ends, the rocker arm presented on a fulcrum to accommodate radial slippage by the annulus members between the retainer ends.

Typically, the annulus members are laminar and presented in a bearing cluster retained by the rocker member.

Typically, the annulus members are nominally aligned along an axis for the bearing.

Possibly, the annulus members incorporate perforations to retain lubricant in use.

Typically, the annulus members have an internal castellated bearing surface.

Generally, the annulus members are formed from a metal and most typically an aluminium alloy. Advantageously, the annulus members are shaped by a laser cutting process. Possibly, the annulus members incorporate lubrication through troughs formed upon an inner edge and/or an outer edge.

Generally, there is a plurality of rocker members. Typically, the plurality of rocker members is equally spaced about periphery of the plurality of annulus members.

Generally, each rocker member is held in a mounting upon the fulcrum. Typically a mounting is secured to a cradle structure. Generally the mounting is secured to a retaining plate. Typically, the retaining plate locks and prevents rotation of the mounting and the annulus members.

Typically, the fulcrum is formed by a notch in one side of the rocker member. Generally, lubricant is retained between the annulus members. Generally, lubricant is retained by a capillary action.

Also in accordance with aspects of the present invention there is provided a turnover stand for component assembly, display and storage including a bearing as described above.

Aspects of the present invention will now be described by way of example and with reference to the accompany drawings in which.

As indicated above generally previous bearings utilised for non-continuous, low speed, low rotational duty applications tended to be similar to those already available for higher specification and duty operations. In such circumstances, prior bearings for stands are relatively costly for the necessary performance requirements.

Figure 1:
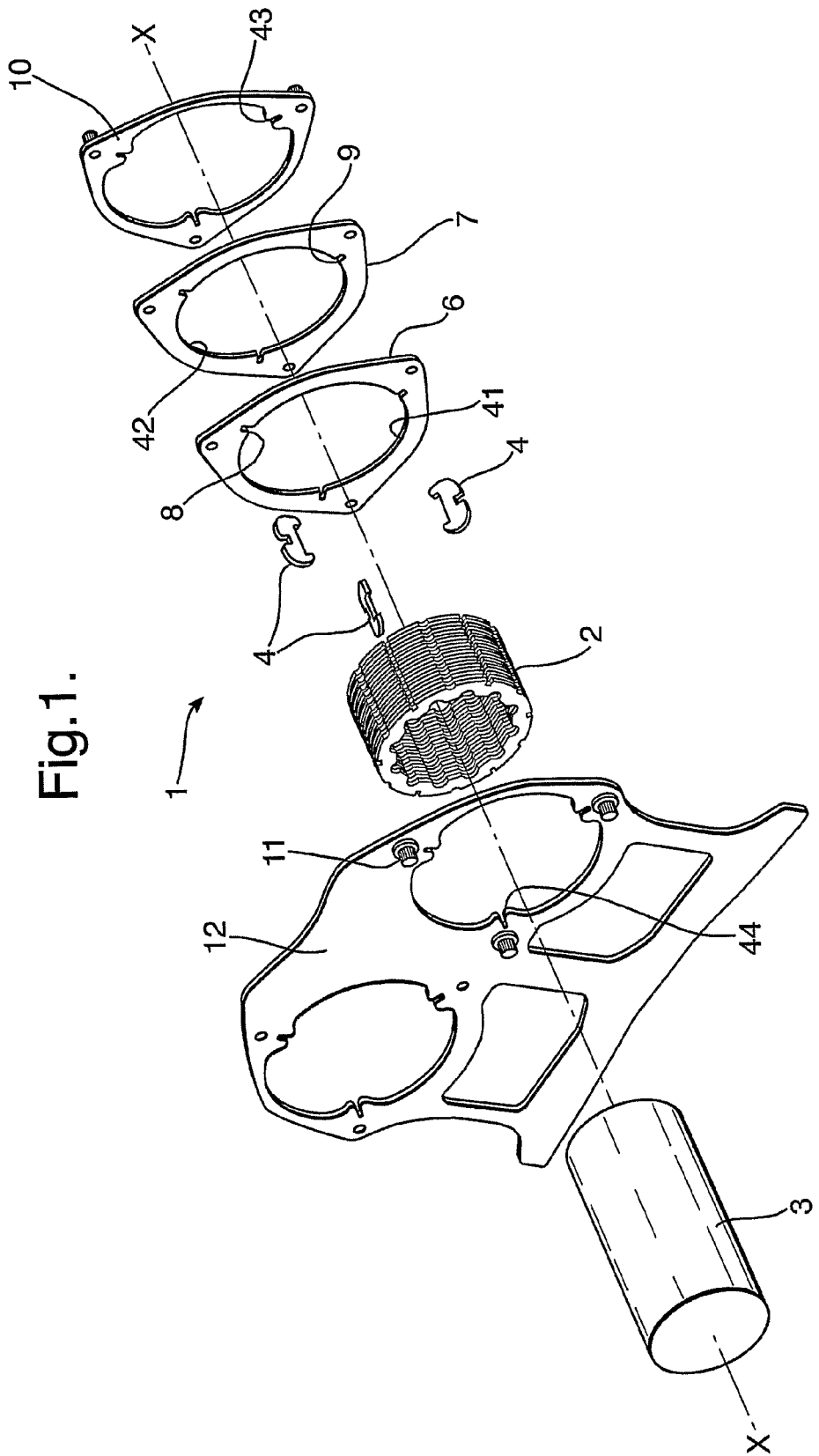
FIG. 1 is an exploded schematic view of elements of a bearing in accordance with aspects of the present invention.
Figure 2:
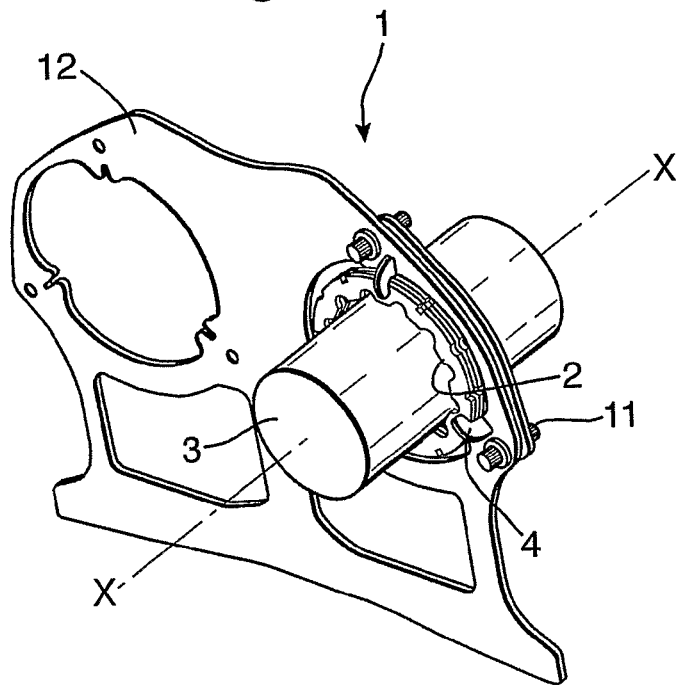
FIG. 2 is a schematic perspective view of the bearing depicted in FIG. 1 in an assembled state.

FIG. 1 and FIG. 2 illustrate respectively a bearing 1 in accordance with aspects of the present invention in an exploded perspective view and when assembled. The bearing 1 in accordance with aspects of the present invention comprises a number of annulus members 2 presented in a laminar stack in order to support a shaft 3 arranged to rotate about a nominal axis X-X in use. The annulus members 2 are generally laminar elements of similar shape and as will be described later with regard to FIG. 3 formed by a laser cutting process in order to provide necessary bearing surfaces on an inner ring. The annulus members 2 are secured using rocker members 4 generally equally spaced about an outer periphery of the assembly of annulus members 2 and located within a fulcrum notch 5 in each member 2 to engage a fulcrum mounting plate or plates 6, 7. The mounting plates 6, 7 themselves are retained by a retaining plate 10 through stud fastenings 11 associated with a structure such as part of a cradle or a turnover stand 12.

The annulus members 2 have a central aperture as a bearing ring through which the shaft 3 passes and is presented. The annulus members 2 associated together define a bearing cluster which by presentation upon the rocker members 4 are individually articulated to allow for adjustment and eccentricity by the shaft 3 in rotation as well as shaft 3 mis-alignment. Generally, as will be described later, the annulus members 2 are shaped to incorporate recesses or troughs as well as possibly perforations to facilitate lubrication oil and fluid retention in use.

As indicated above bearings in accordance with aspects of the present invention are particularly useful with regard to low speed non-continuous rotation installations. In such circumstances radial slide between the respective annulus members 2 accommodates for eccentricities in the supported shaft 3. However, it will also be understood that each annulus 2 could simply comprise a ring with a smooth internal surface and an appropriate number of rocker arm slots as described later cut in a peripheral edge to accommodate the rocker arms 4.

In accordance with aspects of the present invention the bearing cluster of annulus members 2 is held in place by the rocker arms 4 but in a relatively loose manner. In such circumstances, there is a pivot about the fulcrum 2 and accommodation can be made for mis-alignments of the members 2 relative to the shaft 3. In assembly generally the annulus members 2 will be loaded into the rocker arms 4 by consecutive alignment and stacking through the rocker arm slots until respective retaining features at each end of the rocker arm are engaged.

Figure 3:
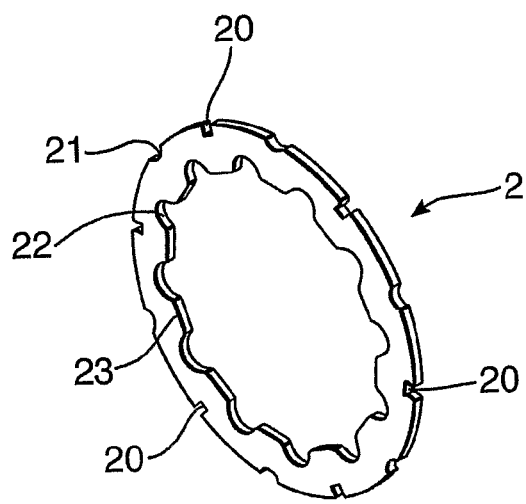
FIG. 3 is a schematic perspective view of an annulus member in accordance with aspects of the present invention.

FIG. 3 provides a more detailed perspective view of an annulus member 2. Thus, as indicated above the annulus member 2 comprises a laminate component or element incorporating rocker arm location slots 20 along with recesses or troughs 21, 22 to facilitate rotation and lubrication. An inner ring edge of the annulus member 2 is generally castellated and provides a bearing bore for the bearing in accordance with aspects of the present invention. Innermost surfaces of the member 2 therefore are presented towards the shaft 3 (FIGS. 1 and 2) in order to provide a bearing effect.

As indicated previously the members 2 are generally articulated about rocker arms engaging the rocker grooves 20 in use. Such articulation will accommodate eccentricities with regard to rotation of the shaft. Furthermore, generally a bearing in accordance with aspects of the present invention will be whetted with a lubricating oil or similar fluid. As the annulus members 2 are stacked side by side and in close proximity due to retention between retainers of the rocker member it will be understood that lubricant will be held by surface tension and capillary action between the flat adjacent surfaces of a member 2 in use. By providing troughs and recesses 21, 22 such lubrication is further improved.

Figure 4:
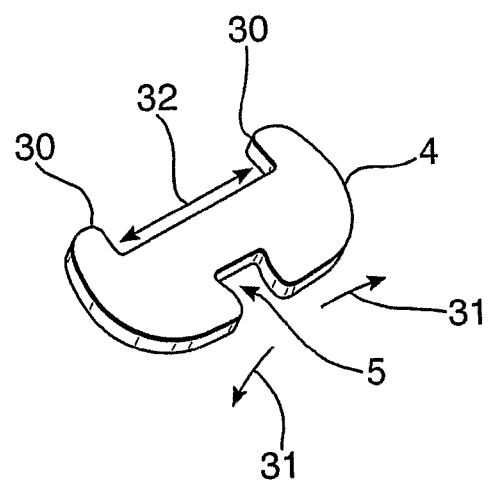
FIG. 4 is a schematic perspective view of a rocker member in accordance with aspects of the present invention.

FIG. 4 provides a schematic perspective view of a rocker element 4 in accordance with aspects of the present invention. Thus as described previously the rocker member 4 generally takes the form of an arm with a fulcrum notch 5 on one side and retainers 30 on an opposed side between which annulus members 2 in accordance with aspects of the present invention are retained loosely. The rocker member 4 can rock in the direction of arrow heads 1 to provide articulation of annulus members 2 retained between the retainers 30 across a gap 32.

As indicated above during assembly the annulus members 2 will be loaded into the appropriate number of rocker members 4 between the retainers 30. After fitting the annulus members 2 to the rocker members 4, the fulcrum plates can be passed over the rocker arms and turned into place. Thus, the rocker arms or members 4 will be aligned with the rocker grooves 8, 9 in the fulcrum plates 6, 7 then turned such that the fulcrum notches 5 are held upon peripheral edge portions of 41, 42 of the fulcrum plates 6, 7. Thus, the annulus members 2 will then be able to articulate about the fulcrum pivot created by the slots 20 in engagement with parts of the fulcrum plate 6, 7. It will be appreciated with the annulus members 2 retained upon the rocker members 4 which in turn are then retained upon the fulcrum plates 6, 7 that a generally stable and robust assembly is provided.

The assembly of annulus members 2, rocker members 4 and fulcrum plates 6, 7 is then associated with a structure 12 such as a cradle or turn-over stand through retaining studs or bolts 11 and a retaining plate 10 as illustrated with regard to FIGS. 1 and 2. Assembly is achieved by presenting the combination of members 2, 4 and retaining plates 6, 7 to the structure 12 so that ends of the rocker arms index into three radial receptor slots 43 in the retainer plate 10. In such circumstances the whole bearing assembly is then offered up to the structure 12 so that other ends of the rocker members 4 engage receptor slots 44 in the structure 12. The retaining studs or bolts 11 are then utilised to secure the retaining plate 10 to the structure 12. Through the engagement between the rocker members 4 and the receptor slots 43, 44 it will be appreciated that rotation is prevented whilst pivot about the fulcrum created between the fulcrum notch 5 and parts 41, 42 of the fulcrum plate 6, 7 is provided.

It will be appreciated by creation of a bearing assembly as described above with the bearing cluster comprising the annulus members 2, each individual laminate or annulus member is articulated. Between each adjacent pair of annulus members 2 in a single bearing cluster is a natural shear plane lying perpendicular to the bearing axis X-X. The shear plane will facilitate relative radial movement between the annulus members 2 to accommodate eccentricity in rotation and mis-alignment of a shaft. The extent and mis-alignment allowable for eccentricity between the annulus members is controlled by the rocker member 4 and the relative pivot fit within the location slots or fulcrum groove 5 in engagement with the fulcrum plates 6, 7. It will be appreciated that the rocker members 4 as indicated are located upon the fulcrum plates or rings 6, 7 which pass circumferentially through the fulcrum notches 5 of each rocker member. By such means the bearing cluster of annulus members 2 can be located as a stable assembly within a fulcrum ring which is ultimately rigidly associated or otherwise with an independent structure such as a turnover stand.

The annulus members 2 in accordance with aspects of the present invention will generally be sized for a particular solid circumferential shaft 3 (FIGS. 1 and 2). In such circumstances the bearing cluster created by the annulus rings can accommodate any angular misalignment of the shaft 3 to the expected or natural axis X-X of the bearing. This adjustment will be accommodated by appropriate radial slippage between the annulus members 2 as laminates held upon the rocker members 4. Such slippage will be along natural shear planes which will allow the rocking action of the members 4 to oscillate about the bottom pivot of the fulcrum notches against the inner diameter of the fulcrum rings 6, 7.

It will be appreciated that not all rocker members 4 can be simultaneously and axially aligned with any particular orientation of the shaft. Furthermore, any swash rotation of the shaft 3 as different from cylindrical rotation of the shaft 3 within a misaligned bearing would cause a corresponding procession of responses from the individual annulus member 2. In such circumstances the annulus members 2 are a loose fit within the width between retainer ends of each rocker member 4. It will also be understood that the maximum angle of shaft misalignment permitted by the association of annulus members 2 is closely related to the diametric running clearance and thickness/thinness of the respective annulus members 2 held upon the fulcrum of the rocker members 4.

Generally continuous lubrication is provided by a capillary or leaching action of the lubricant from that naturally stored and retained in the capillary space between the respective annulus members 2. The bearing may be bathed in lubricant or simply periodically oiled when required as there will be no long term operational duty.

Spinning and rotation of the assembly of annulus members 2 in either direction is prevented by capture of the respective ends of the rocker members 4 in the fixed radial receptor slots of the retaining plate 10 and structure 12. It will be understood that the central oscillation of the bearing created by the members 2 is at the diametric centre of the shaft which in turn is the axial centre of the fulcrum rings 6, 7.

It will be appreciated the actual number and thickness of the annulus members 2 formed as laminates in a stack as well as the number and distribution of rocker arms 4 and the number of fulcrum rings will generally be chosen dependent upon individual bearing loads and applications. The embodiments of the present invention described are simply for illustration purposes only.

Figure 5:
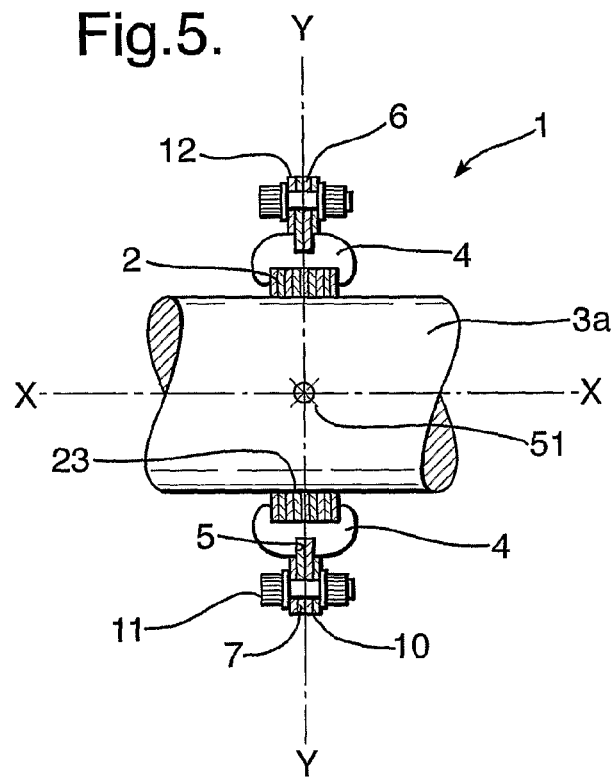
FIG. 5 is a schematic cross view of a bearing associated with a shaft in accordance with aspects of the present invention; and, FIG. 6 is a side view of the bearing depicted in FIG. 5 in a mis-aligned condition.
Figure 6:
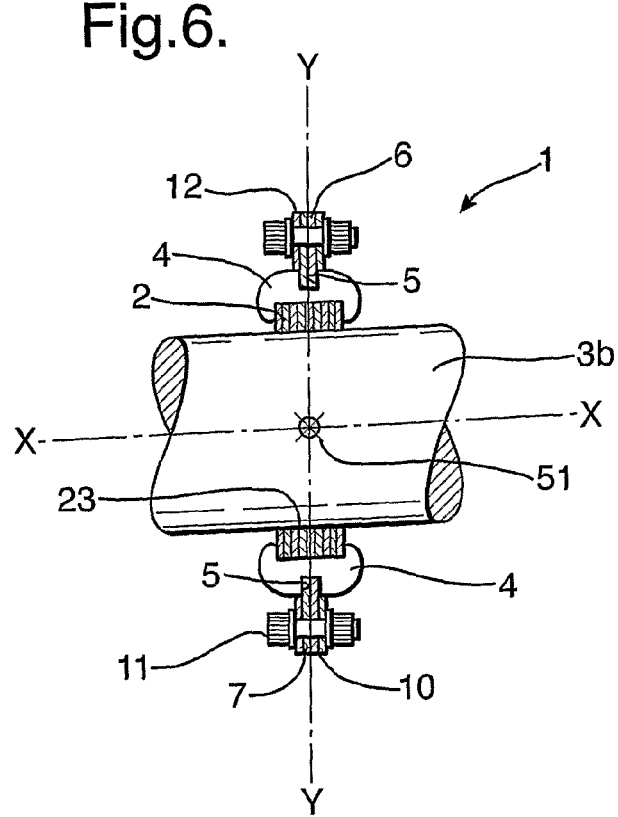

FIGS. 5 and 6 illustrate as schematic cross sections the assembly 1 respectively associated with an axially aligned shaft and a shaft at an askew or swash angle.

In FIG. 5 the shaft 3a is aligned. Thus, as can be seen the annulus members 2 are aligned with the rocker arms 4 suspended upon the pivot provided by the fulcrum ring 6, 7 to appropriately present the inner bearing surface 23 to the shaft 3a.

It will be understood that a centre of oscillation 51 is defined as an imaginary point about which the swash action of the bearing 1 in accordance with aspects of the present invention and therefore the shaft 3 can be considered as centred.

The centre of oscillation 51 is defined at the axial centre in the plane Y-Y of the fulcrum rings 6, 7 where that axial centre bisects the centre of rotation of the shaft 3 (X-X). It will be appreciated the centre of oscillation 51 has no relevance for a shaft 3 with a cylindrical rotation within a misaligned bearing as no swash angle changes or dynamics are involved.

FIG. 6 illustrates a shaft 3b when subject to mis-alignment at a swash angle. In the example illustrated this swash angle is about 2.5 degrees. As can be seen the shaft 3b is tilted such that the bearing surface 23 in engagement with the shaft 3b is displaced out of the aligned configuration as depicted in FIG. 5. The shaft 3b has effectively turned about the centre of oscillation 51. In order to accommodate this misalignment the rocker members 4 have pivoted about the fulcrum slots 5 to appropriately present the annulus members 2.

By aspects of the present invention a bearing 1 is provided which is formed from relatively inexpensive sheet materials. The sheet materials are cut by a laser process to define annulus members or rings along with rocker members and fulcrum plates or members. The bearing is retained between a retainer plate and a structure such as a turnover stand or cradle. These members can be relatively cheaply formed and therefore provide a bearing which is inexpensive and can be sized and arranged for expected loads and pre-existing parameters of assembly, presentation and repair stands. The components as indicated can be formed by a cheap laser cutting process from a flat sheet allowing a two dimensional design of the bearing. The bearings in accordance with aspects of the present invention are also relatively robust having few parts which may be subject to problems and limited wear as a result of long term rotation.

In order to improve lubrication retention the annulus members forming the laminates of the bearing cluster can incorporate perforations or dimples within which lubricating oil or fluid can be retained. Similarly, troughs as indicated above in the annulus members will allow cleaning and lubrication of the bearing in accordance with aspects of the present invention.

As indicated above adjustment for misalignment of the shaft is generally through radial slippage between the respective annulus members in the bearing cluster. In such circumstances there is a self damping aspect to the bearing. Damping is provided by high friction properties between the annulus members. Such damping will also tend to prevent free turnover or rollover of the bearing which can be a health and safety hazard.

As bearings in accordance with aspects of the present invention do not incorporate rolling members, it will be understood that it is not necessary to machine a bearing housing for such rolling members again reducing costs for a limited rotation duty bearing.

It will be appreciated the materials from which bearings in accordance with aspect of the present invention are formed are important in terms of achieving an acceptable level of performance and operational function. The contact elements, that is to say the annulus members in accordance with aspects of the present invention will be formed from a metal such as an aluminium alloy. Other parts of the bearing in accordance with aspects of the present invention may be formed from steels but in any event the materials chosen will be to allow a robust bearing to be created at acceptable costs.

Modifications and alterations in accordance with aspects of the present invention will be appreciated by those skilled in the art. Thus, surfaces between the annulus members may be coated with a low friction material to facilitate articulation and radial adjustment in use. Bearing surfaces of the annulus members may be coated or otherwise treated to achieve desirable engagement or wear resistance with a shaft in use. Generally, rocker members and therefore rocker slots in accordance with aspects of the present invention will be evenly and equally distributed about the bearing for balance. The number of rocker member combinations with rocker slots will be chosen depending on operational requirements but typically as illustrated there will be at least three such combinations to enable articulation of the annulus members to provide a bearing function as well as adaptability with regard to shaft eccentricity.

The invention claimed is:

1. A bearing having a plurality of annulus members, each annulus member having a rocker indent to receive a rocker member extending over the plurality of annulus members between retainer ends, the rocker member presented on a fulcrum to accommodate radial slippage by the annulus members between the retainer ends.

2. A bearing as claimed in claim 1 wherein the annulus members are laminar and presented in a bearing cluster retained by the rocker member.

3. A bearing as claimed in claim 1 wherein the annulus members are nominally aligned along an axis for the bearing.

4. A bearing as claimed in claim 1 wherein the annulus members incorporate perforations to retain lubricant in use.

5. A bearing as claimed in claim 1 wherein the annulus members have an internal castellated bearing surface.

6. A bearing as claimed in claim 1 wherein the annulus members are formed from a metal.

7. A bearing as claimed in claim 1 wherein the annulus members are shaped by a laser cutting process.

8. A bearing as claimed in claim 1 wherein the annulus members incorporate lubrication troughs formed upon an inner edge and/or an outer edge.

9. A bearing as claimed in claim 1 wherein there is a plurality of rocker members.

10. A bearing as claimed in claim 9 wherein the plurality of rocker members are equally spaced about the plurality of annulus members.

11. A bearing as claimed in claim 1 wherein the rocker member is held in a mounting upon the fulcrum.

12. A bearing as claimed in claim 11 wherein a mounting is secured to a cradle structure.

13. A bearing as claimed in claim 11 wherein the mounting is secured to a retaining plate.

14. A bearing as claimed in claim 13 wherein the retaining plate prevents rotation of the mounting member and the annulus members.

15. A bearing as claimed in claim 1 wherein the fulcrum is formed by a notch in one side of the rocker member.

16. A bearing as claimed in claim 1 wherein lubricant is retained between the annulus members.

17. A bearing as claimed in claim 16 wherein the lubricant is retained by a capillary action.

18. A turnover stand for component assembly, display and/or storage including a bearing having a plurality of annulus members, each annulus member having a rocker indent to receive a rocker member extending over the plurality of annulus members between retainer ends, the rocker member presented on a fulcrum to accommodate radial slippage by the annulus members between the retainer ends.

* * * * *